(12) United States Patent
See et al.

(10) Patent No.: US 7,260,452 B2
(45) Date of Patent: Aug. 21, 2007

(54) APPARATUS, METHOD AND COMPUTER PROGRAM PRODUCT FOR MONITORING AC LINE CURRENT THROUGH THE STEP START RESISTORS OF A HIGH VOLTAGE POWER SUPPLY

(75) Inventors: Alvin B. See, Westfield, MA (US); Paulo Correa, Kingston, PA (US)

(73) Assignee: Thomson Licensing, Boulogne-Billancourt (FR)

( * ) Notice: Subject to any disclaimer, the term of this patent is extended or adjusted under 35 U.S.C. 154(b) by 92 days.

(21) Appl. No.: 11/299,675

(22) Filed: Dec. 13, 2005

(65) Prior Publication Data

US 2006/0106502 A1 May 18, 2006

Related U.S. Application Data

(62) Division of application No. 09/912,493, filed on Jul. 26, 2001, now Pat. No. 7,006,897.

(51) Int. Cl.
*H02H 3/08* (2006.01)

(52) U.S. Cl. ................ 700/292; 700/286; 318/784
(58) Field of Classification Search ........... 700/286, 700/292; 318/783, 784, 779
See application file for complete search history.

(56) References Cited

U.S. PATENT DOCUMENTS

| 4,142,136 | A | * | 2/1979 | Witter ...................... 318/779 |
| 4,235,309 | A | | 11/1980 | Kuhl ....................... 187/293 |
| 4,558,275 | A | | 12/1985 | Borowy et al. |
| 4,581,705 | A | | 4/1986 | Gilker et al. |
| 4,694,402 | A | | 9/1987 | McEachern et al. |
| 4,745,512 | A | | 5/1988 | Hampson .................. 361/36 |
| 4,815,002 | A | | 3/1989 | Verbanets |
| 5,057,962 | A | * | 10/1991 | Alley et al. ................ 361/24 |
| 5,399,964 | A | | 3/1995 | Zoller |
| 5,600,527 | A | | 2/1997 | Engel et al. |
| 5,629,825 | A | | 5/1997 | Wallis et al. ............... 361/64 |
| 5,642,268 | A | | 6/1997 | Pratt et al. |
| 5,706,204 | A | | 1/1998 | Cox et al. |
| 5,712,551 | A | | 1/1998 | Lee ........................ 318/466 |
| 5,754,440 | A | | 5/1998 | Cox et al. |
| 5,890,097 | A | | 3/1999 | Cox |
| 5,994,790 | A | | 11/1999 | Nagashima et al. ....... 307/10.1 |
| 6,459,972 | B2 | | 10/2002 | Kodaka et al. ............. 701/43 |

\* cited by examiner

*Primary Examiner*—Leo Picard
*Assistant Examiner*—Steven R. Garland
(74) *Attorney, Agent, or Firm*—Joseph J. Laks; Robert B. Levy

(57) ABSTRACT

A circuit to monitor ac line current through resistors employed to provide a 'step start' in a power supply, including means to monitor the current flowing through the step start resistors, comprising a peak detector, a sample and hold circuit, an analog to digital convertor and a microprocessor. The output of the current monitoring circuit may be employed to abort starting if abnormalities are sensed. The circuit may also be used to identify when the step start resistors need longer cooling time, and to continuously monitor current at times other than during starting. A timing circuit is also incorporated, which senses zero crossings of the voltage input to the power supply, so as to control the timing of the current monitoring circuit. The discrete circuits employed may be replaced by either a digital signal processor integrated circuit or a general-purpose computer implementing the same steps in a suitable algorithm.

37 Claims, 5 Drawing Sheets

APPARATUS, METHOD AND COMPUTER PROGRAM PRODUCT FOR MONITORING AC LINE CURRENT THROUGH THE STEP START RESISTORS OF A HIGH VOLTAGE POWER SUPPLY

BACKGROUND OF THE INVENTION

1. Field of the Invention

The present invention generally relates to monitoring circuits for power supplies. More particularly, the present invention relates to an apparatus, method and computer program product for monitoring AC line current through the step start resistors of a high voltage power supply, which may be employed with devices such as high power transmitting tubes, etc.

2. Discussion of the Background

Over the years, power supply systems have been developed for devices, such as high power electron tubes, etc, to provide a 'step start', so that full power is not immediately applied, which otherwise might have deleterious effects upon the longevity of the tubes or other devices. Such systems typically initially insert current limiting devices, such as starting resistors or 'step start' resistors, into the supply circuits to limit the current for a predetermined time interval, which will be referred to herein as the 'step start interval', and then remove these resistors from the circuits to begin normal operation.

However, as presently recognized, such conventional systems do not provide means to identify abnormal characteristics in the current feeding the power supply during the step start interval, or to cause the start process to be aborted if such abnormal characteristics are detected. In addition, neither do such conventional systems provide means to identify when the step start resistors need longer cooling time due to higher than normal energy dissipation from overloads and frequent restarts. In fact, step start systems, by their very nature, by limiting current during the step start interval also effectively limit the ability of any existing or separate protective circuitry to sense a current overload and to protect an associated load circuit, such as by opening a circuit breaker. If the overload condition persists once the step start resistors are removed from the circuit, then a large surge current will flow until the protective circuitry can respond to the overload condition.

SUMMARY OF THE INVENTION

The present invention recognizes that, in systems of this type where high voltages are employed, arcing or other fault conditions may occur during the step start interval as well as during normal operation, and that if such conditions occur during the step start interval the step start process should be aborted. The present invention further recognizes that, especially when faults or overloads occur during the step start, the step start process may be repeated several times in succession, allowing the step start resistors to become progressively hotter.

Accordingly, an object of this invention is to identify abnormal characteristics to the current feeding a device such as a high voltage power supply (HVPS), etc, during a step start and cause a start process to be aborted.

Another object of this invention is to identify when the step start resistors need longer cooling time due to higher than normal energy dissipation from overloads and frequent restarts.

Another object of this invention is to continuously monitor the AC line current feeding a device such as a high voltage power supply (HVPS), etc, to capture data on overloads or phase imbalances that may occur at times other than during the step start.

The above and other objects are achieved according to one aspect of the present invention by providing a novel apparatus, method and computer program product for monitoring current in a step start process, including connecting power to a load through current limiting devices for a step start interval of time; measuring current signals representing current flowing through the current limiting devices; sampling the current signals to obtain step start current sample values; comparing the step start current sample values with a known acceptable pattern to detect abnormal characteristics; and disconnecting the power from the load if abnormal characteristics are detected.

In another aspect of the present invention there is provided a novel apparatus, method and computer program product for determining a minimum cooling down time for current limiting devices in a step start process, including measuring a rate of cooling of the current limiting devices; connecting power to a load through the current limiting devices for a step start interval of time; measuring current signals representing current flowing through the current limiting devices; sampling the current signals during sampling time intervals to obtain step start current sample values; squaring the step start current sample values to give heat values related to heat dissipated during each sampling time interval; summing the heat values for all sampling time intervals during the step start interval to give a total heat value related to total heat energy dissipated by the current limiting devices during the step start interval; and determining the minimum cooling down time for the current limiting devices, dependent upon the total heat value and the rate of cooling.

In another aspect of the present invention there is provided a novel apparatus, method and computer program product for monitoring current, including connecting power to a load; measuring current signals representing current supplied to the load; obtaining voltage signals representing voltage applied to the load; generating timing signals from the voltage signals; sampling the current signals during sampling time intervals determined by the timing signals to obtain operating current sample values; and comparing the operating current sample values with a known acceptable pattern to detect abnormal characteristics.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
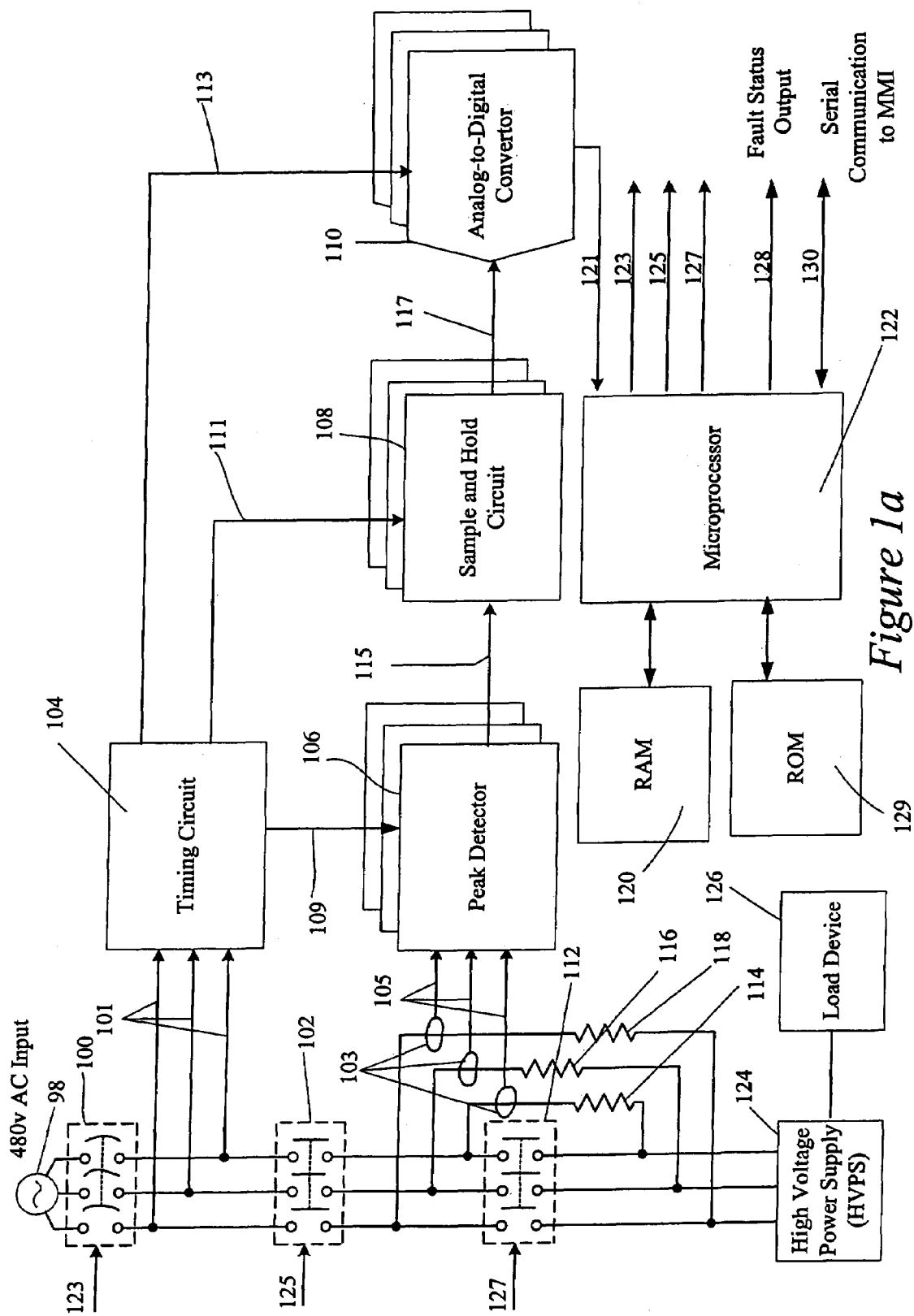
FIG. 1a is a block diagram according to a first embodiment of the present invention.

Referring now to the drawings, wherein like reference numerals designate identical or corresponding parts throughout the several views, and more particularly to FIGS. 1a-4 thereof, there are shown various embodiments of the present invention, as will now be described.

FIG. 1a is a block diagram of a first preferred embodiment of the present invention. In FIG. 1a, the system includes an external power source 98 (e.g., 480 V AC); a circuit breaker 100, a main contactor 102, a step contactor 112, step resistors 114, 116 and 118, a timing circuit 104, current sensors 103, peak detectors 106, sample and hold circuits 108, analog to digital convertors 110, a microprocessor 122, RAM (Random Access Memory) 120, ROM (Read Only Memory) 129, and a load comprising a High Voltage Power Supply (HVPS) 124 and a load device 126 supplied therefrom. The high voltage power supply 124 may provide the beam power supply to a high power transmitting electron tube such as a klystrode (a hybrid klystron/beam tetrode), but the load device 126 may also be any other appropriate type of electrical device, such as, for example, a dynamoelectric motor or a lower power electron tube. The external AC power source 98 is shown as having three phases, but it should be appreciated by those skilled in the art that the invention may be practiced with single phase AC power, or with polyphase AC power having a number of phases other than three. Similarly, although separate peak detectors 106, sample and hold circuits 108 and analog to digital convertors 110 are illustrated for each phase it will be appreciated by those skilled in the art that the invention may be practiced with a single peak detector 106, a single sample and hold circuit 108 and a single analog to digital convertor 110. Also, although the sample and hold circuits 108 and the analog to digital convertors 110 are shown here as separate from each other, it will be appreciated by those skilled in the art that the sample and hold function may be a built-in feature of an analog to digital convertor integrated circuit chip. The microprocessor 122 may also incorporate the analog to digital convertors 110, the RAM 120 and/or the ROM 129 as built-in features, as will be appreciated by those skilled in the art. The invention may also be practiced by employing a digital signal processor 200, to be described with respect to FIG. 2, or by employing a computer system 402 to be described with respect to FIG. 4. It will also be appreciated by those skilled in the art that the step start resistors 114, 116 and 118 may, where appropriate, be replaced with other current limiting devices, such as inductors or semiconductor devices, without departing from the scope of the invention.

A first embodiment of the present invention will now be described with reference to FIG. 1a. In normal operation, AC power is supplied from the external power source 98 via the circuit breaker 100, the main contactor 102 and the step contactor 112 to the high voltage power supply 124. The high voltage power supply 124 provides at least one operating supply voltage to the load device 126, e.g. the high voltage power supply 124 may provide the beam voltage to a high power klystrode tube as discussed above. The circuit breaker 100 is arranged to be tripped by fault conditions, as will be appreciated by those skilled in the art. Initially, power from the external power source 98 is applied to the high voltage power supply 124 by closing the main contactor 102. The step contactor 112 remains open during a step start interval, after the main contactor 102 is closed, so that power is routed from the external power source 98 to the high voltage power supply 124 via the step start resistors 114, 116 and 118. The duration of the step start interval may be determined by the microprocessor 122 or by any conventional timing means known in the art. After the step start interval, the step contactor 112 is closed, so that power is routed from the external power source 98 to the high voltage power supply 124 without passing through the step start resistors 114, 116 and 118.

During the step start interval, voltage samples 101 from each phase of the external AC power source 98 are provided to the timing circuit 104, which comprises one or more zero voltage crossing detectors, and which outputs a first timing signal 109, a second timing signal 111 and a third timing signal 113. Zero voltage crossing detectors are well known in the art, and any conventional circuit may be employed in this invention to detect zero voltage crossing.

The timing signal 109 from the timing circuit 104 is used to enable the peak detector 106 for an enable period of about 5 milliseconds (e.g., to capture the current waveform rise and peak). At the end of this enable period, the sample and hold circuit 108 is triggered by the second timing signal 111, and analog current sample values 117 captured by the sample and hold circuit 108 are applied to the analog-to-digital convertor 110, which is triggered by the third timing signal 113. After capturing current samples with the sample and hold circuit 108, the peak detector 106 is discharged. These steps are repeated for each half cycle of current for each phase.

The current sensors 103 are employed to monitor the current flowing through the step start resistors 114, 116 and 118 during the step start interval, and thereby provide current signals 105 for each phase to the peak detector 106. The current sensors 103 may be current transformers, Hall effect sensors, meter shunts, isolation amplifiers, or any other suitable current sensors known in the art. The peak detector 106 provides peak current signals 115 to the sample and hold circuit 108, which in turn provides analog current sample values 117 to the analog-to-digital convertor 110, which provides digital current sample values 121 to the microprocessor 122. The captured peak current sample values 121 are saved in the RAM 120 and compared to a known acceptable pattern by the microprocessor 122 by means of a suitable program stored in the ROM 129, to determine excessive deviation. A known acceptable pattern, might, for example, be a continuous reduction of the current from, say 400 Amperes to 40 Amperes over a one second step start interval, but actual values will vary for each case in which the invention is applied. For a step start interval of ¼ second, about 100 samples will accumulate. If excessive deviation from the known acceptable pattern occurs, thereby identifying abnormal characteristics in the current waveform feeding the high voltage power supply 124, the start process is caused to be halted by the microprocessor 122 acting upon a switching device, e.g. by opening the main contactor 102 or by forcing tripping of the circuit breaker 100.

In the above embodiment, samples are only taken during the step start interval. After the step start interval is complete, the data saved in the RAM 120 is sent by the microprocessor 122 to a MMI (Man Machine Interface, not shown) via a serial communication interface 130, as a block for display and storage. The sampling occurs rapidly (e.g., in the above sampling scheme with three-phase power there would be 360 samples per second for 60 Hz power, or 300 samples per second for 50 Hz power), and saving the data for later transfer removes the need for real-time transfer.

The total heat energy produced during each step start interval can be calculated by integrating the peak current sample values 121 over time, since it is known when each sample was taken and the resistance of the step start resistors is also known or can easily be measured by any method known in the art. The power dissipated as heat by each step start resistor is equal to $I^2R$, where I represents the current flowing through the step start resistor, and R represents the resistance of the step start resistor. Since the current samples are taken at essentially fixed sampling time intervals determined by the power waveform, the heat dissipated is proportional to the sum of the squares of the peak current sample values. A rate at which cooling takes place for a given case may be determined empirically. A minimum cooling down time for the step start resistors (for which only an approximate value is required) can be estimated by the microprocessor 122 from the peak current sample values 121 by means of a suitable program stored in the ROM 129. In normal operation, whenever power is disconnected either by opening the main contactor 102 or by tripping the circuit breaker 100, the microprocessor 122, or another timing device employed for this purpose, opens the main contactor 102 if not already open, and maintains the main contactor 102 in the open position until the minimum cooling down time has elapsed. This prevents excessive heating of the step start resistors The microprocessor 122 may also be programmed to detect short circuits and/or an open phase condition in the high voltage power supply 124 and to generate a fault signal at a fault status output 128. A display device (e.g., display 414 of FIG. 4) may also be provided to visually check the step start current, which can help an operator to diagnose unusual problems.

With additional software and RAM the above circuit can be used to monitor the AC current to the high voltage power supply 124 on a continuous basis. The dynamic range of current changes from about 20:1 during step start to about 100:1 after step start. For continuous monitoring, a memory size should be selected to capture all the data samples of a likely to occur, overload event. This will probably be one to two seconds long (e.g., up to about 720 samples.) In a preferred embodiment of this modified form of the invention, the samples are fed into a memory (e.g., the RAM 120) at one end and discarded at the other end. When an overload triggers the memory control, a fixed number of additional samples are accepted, then the memory is locked and transferred into a long term memory for later evaluation. Continuous monitoring then resumes. This process is the similar to that used in a Digital Storage Oscilloscope, such as manufactured by Tektronix or Hewlett-Packard.

Figure 1B:
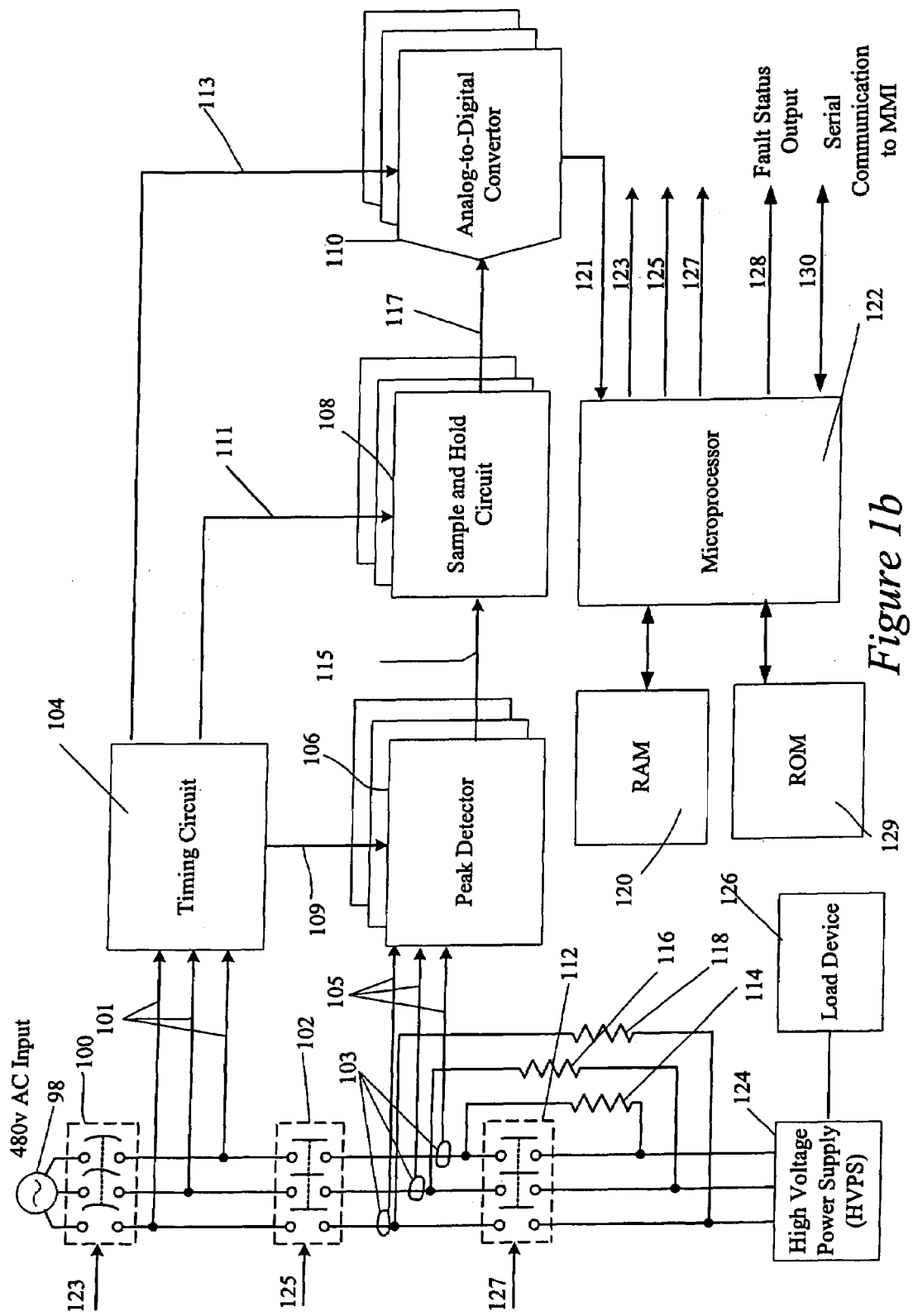
FIG. 1b is a block diagram according to a modified form of the embodiment of FIG. 1a for continuous measurement.

For continuous monitoring of AC line current to the HVPS 124, the current sensors 103 need to be located either after or before the connections to the step start resistors 114, 116 and 118. The latter arrangement is illustrated in FIG. 1b, which shows the current sensors located before the connections to the step resistors 114, 116 and 118, but this circuit is otherwise identical with the circuit of FIG. 1a. The arrangement of FIG. 1b allows monitoring of all the current to the HVPS 124. The current sensors 103 as located in FIG. 1b need to be able to withstand a much higher fault current than when located in the start step resistor branch of the circuit as in FIG. 1a. It will be appreciated by those skilled in the art that similar modifications may be made to the embodiment to be described with reference to FIG. 2, in which the digital signal processor 200 is employed, and with reference to FIG. 4, in which the computer system 402 is employed.

Figure 2:
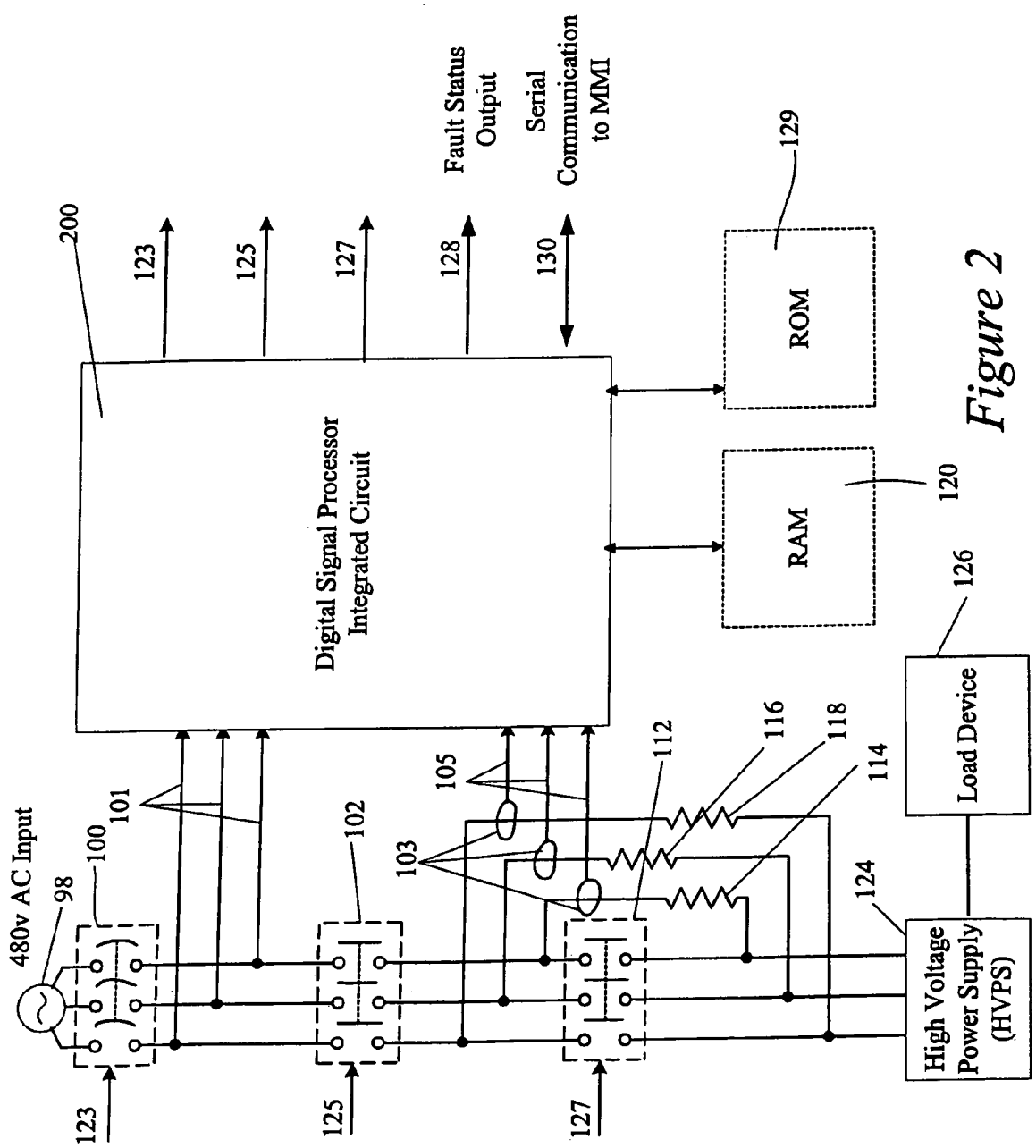
FIG. 2 is a block diagram employing a digital signal processor, according to a second embodiment of the present invention.

FIG. 2 is a block diagram according to a second embodiment of the present invention. In this embodiment, the digital signal processor (DSP) integrated circuit 200 is used to replace all of the monitoring circuitry except the current sensors 103 and optionally also the RAM 120 and/or the ROM 129 (both shown in dashed lines in FIG. 2). The DSP integrated circuit 200 implements the functions of the timing circuit 104, the peak detector 106, the sample and hold circuit 108, the analog to digital converter 110 and the microprocessor 122 of the first embodiment. During the step start interval, the current signals 105 from the current sensors 103 representing the current flowing through the step start resistors 114, 116 and 118, as well as the voltage signals 101 for each phase of the external AC power source 98, are provided to the DSP 200. Data representing digital values of current samples obtained during the step start interval are saved in the DSP 200 or optionally in the separate RAM 120 and compared to a known acceptable pattern to determine excessive deviation.

After the step start interval is complete, the data saved in the DSP 200 or optionally in the separate RAM 120 is sent by the DSP 200 to the MMI (Man Machine Interface, not shown) via the serial communication interface 130, as a block for display and storage.

The minimum cooling down time for the step start resistors 114, 116 and 118 can be determined by the DSP 200 by integrating current samples over time after each step start interval, or can be determined empirically. In normal operation, whenever power is disconnected either by opening the main contactor 102 or by tripping the circuit breaker 100, the DSP 200, or another timing device employed for this purpose, opens the main contactor 102 if not already open, and maintains the main contactor 102 in the open position until the minimum cooling down time has elapsed.

The DSP 200 may also detect short circuits and/or an open phase condition in the high voltage power supply 124 and generate a fault signal at the fault status output 128. A display device (e.g., display 414 of FIG. 4) may also be provided to visually check the step start current.

When using the DSP 200 as in FIG. 2, the sampling rate can be much higher to allow direct mathematical computation of the true RMS (Root-Mean-Square) value of the current, and of the voltage as well. Preferably, the sampling rate should be at least six times the frequency of the highest of the highest order significant harmonic present in the high voltage power supply 124. Direct computation of RMS currents by DSP 200 can eliminate the timing synchronization requirements of peak detectors 106, sample and hold circuits 108 and analog-to-digital converters 110, so that voltage samples 101 may not be required. This data can then be used for other general metering purposes. The DSP 200 can also be used to determine phase rotation for protected motors. Because of the programmable nature of the DSP 200, it allows having measuring features that can be enabled based upon customer needs and upon which sensors have been connected. For example, the circuit according to FIG. 2 could be used only as a voltage monitor.

Figure 3:
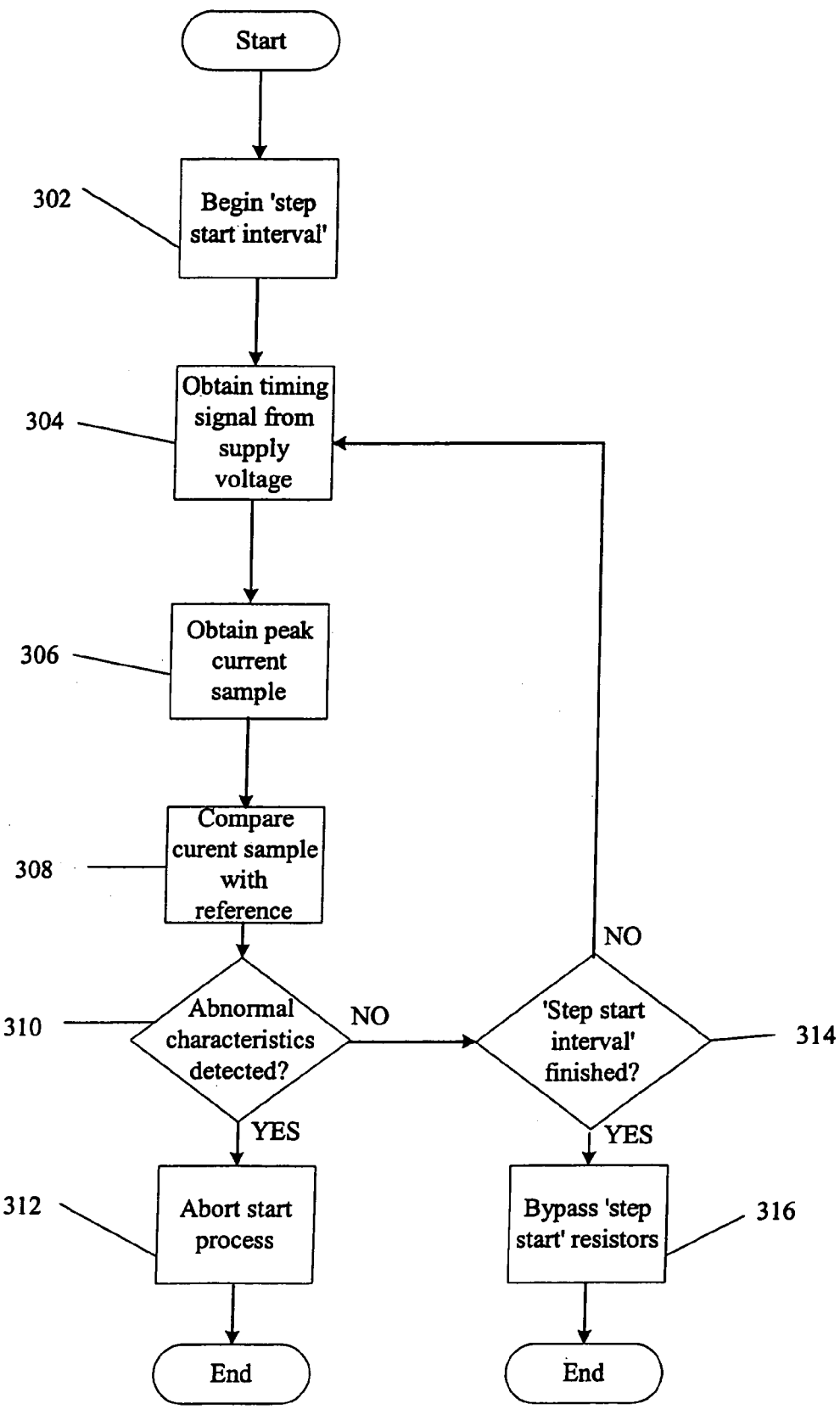
FIG. 3 is a flow chart for illustrating the operation of the apparatus according to the present invention.

FIG. 3 is a flow-chart for illustrating operation of the present invention. In FIG. 3, at step 302, the 'step start interval' is initiated, in which power is delivered to the high voltage power supply 124 via step start resistors 114, 116 and 118. At step 304, timing signals are obtained from the voltage signals 101 representing the output voltages from the external power source 98. At step 306, the current signals 105 from the current sensors 103 are processed to obtain digital values 121 representing peak current samples. Steps 304 and 306 may be performed concurrently. At step 308, the digital values 121 obtained from step 306 are compared with a known acceptable pattern. At step 310, the result of step 308 is evaluated to determine if abnormal characteristics are detected. If so, the step start process is aborted at step 312. If not, step 314 determines if the step start interval has finished. If so, step 316 bypasses the step start resistors 114, 116 and 118, and the load device 126 begins normal (i.e. not 'step start') operation. If not, then steps 304 to 310 are repeated.

The present invention may be implemented by an appropriate network of conventional component circuits. The invention may be conveniently implemented using conventional general-purpose computers, microprocessors, digital signal processors, etc., programmed according to the teachings of the present invention, as will be apparent to those skilled in the computer art. Appropriate software can be readily prepared by programmers of ordinary skill based on the teachings of the present disclosure, as will be apparent to those skilled in the software art.

The present invention stores information relating to various processes described herein. This information is stored in one or more memories such as a hard disk, optical disk, magneto-optical disk, and/or RAM, for example. One or more databases may store the information used to implement the present invention. The databases are organized using data structures (e.g., records, tables, arrays, fields, graphs, trees, and/or lists) contained in one or more memories or any of the storage devices listed in the discussion of FIG. 4, for example.

Figure 4:
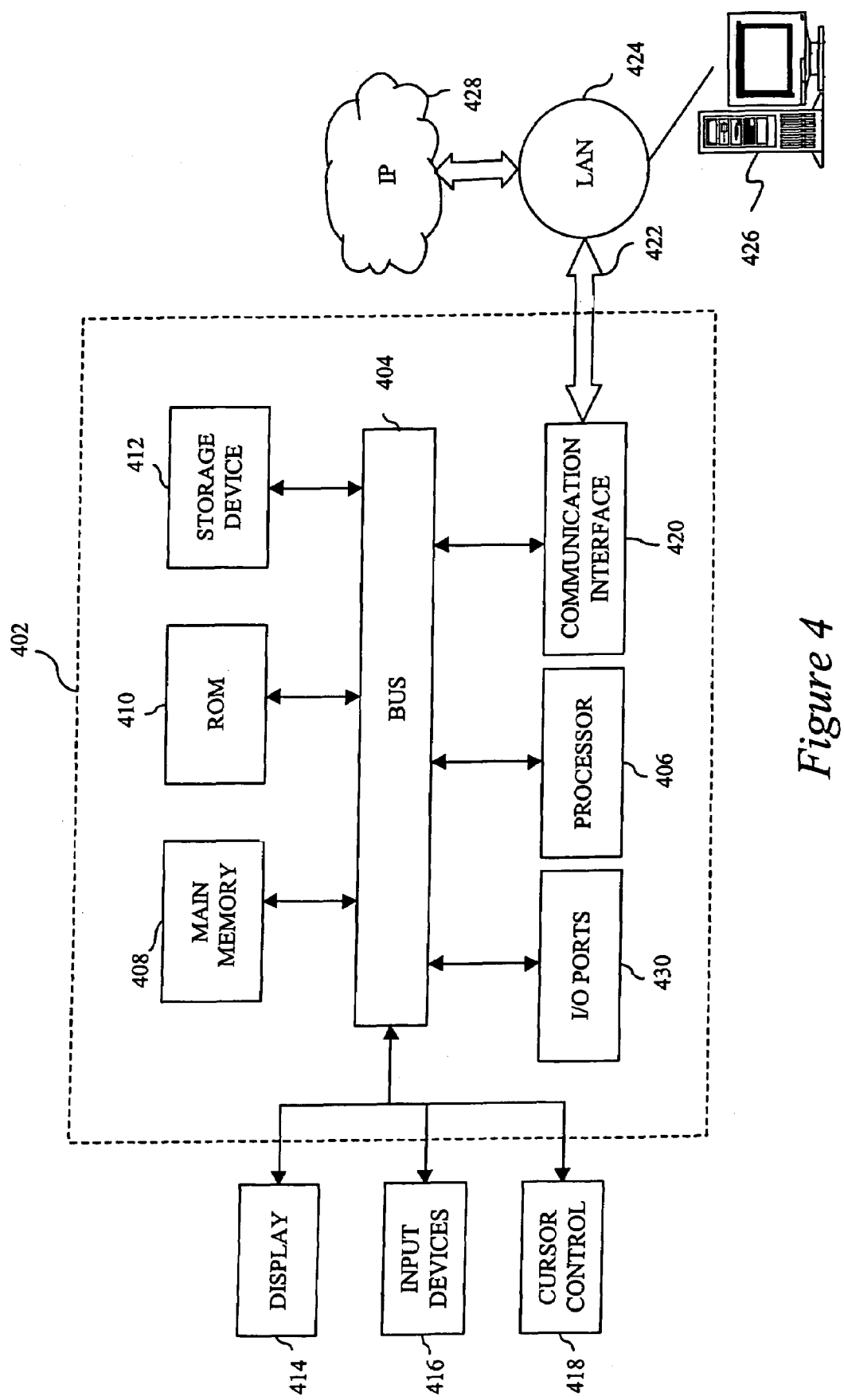
FIG. 4 is a schematic illustration of a system employing a general-purpose computer, which can be programmed according to the teachings of the present invention.

FIG. 4 illustrates a computer system 402 upon which the present invention may be implemented. The computer system 402 may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system 402 includes a bus 404 or other communication mechanism for communicating information and a processor 406 coupled with bus 404 for processing the information. The computer system 402 also includes a main memory 408, such as a random access memory (RAM) or other dynamic storage device (e.g., dynamic RAM (DRAM), static RAM (SRAM), synchronous DRAM (SDRAM), flash RAM), coupled to bus 404 for storing information and instructions to be executed by processor 406. In addition, main memory 408 may be used for storing temporary variables or other intermediate information during execution of instructions to be executed by processor 406. The computer system 402 further includes a read only memory (ROM) 410 or other static storage device (e.g., programmable ROM (PROM), erasable PROM (EPROM), and electrically erasable PROM (EEPROM)) coupled to bus 404 for storing static information and instructions for processor 406. A storage device 412, such as a magnetic disk or optical disk, is provided and coupled to bus 404 for storing information and instructions.

The computer system 402 also includes input/output ports 430 to input signals representing the voltage signals 101 and the current signals 105 and to couple the computer system 402 to the main contactor 102, the step contactor 112 and optionally the circuit breaker 100, to effectuate automatic control thereof, as previously described with respect to FIG. 1a. Such coupling may include direct electrical connections, wireless connections, networked connections, etc., for implementing automatic control functions, remote control functions, etc. Suitable interface cards may be installed to provide the necessary functions and signal levels.

The computer system 402 may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the timing circuit 104, the peak detector 106, the sample and hold circuit 108 or the analog to digital convertor 110 as described in the first embodiment with reference to FIG. 1a. Other removable media devices (e.g., a compact disc, a tape, and a removable magneto-optical media) or fixed, high-density media drives, may be added to the computer system 402 using an appropriate device bus (e.g., a small computer system interface (SCSI) bus, an enhanced integrated device electronics (IDE) bus, or an ultra-direct memory access (DMA) bus). The computer system 402 may additionally include a compact disc reader, a compact disc reader-writer unit, or a compact disc jukebox, each of which may be connected to the same device bus or another device bus.

The computer system 402 may be coupled via bus 404 to a display 414, such as a cathode ray tube (CRT), liquid crystal display (LCD), voice synthesis hardware and/or software, etc., for displaying and/or providing information to a computer user. The display 414 may be controlled by a display or graphics card. The computer system includes input devices, such as a keyboard 416 and a cursor control 418, for communicating information and command selections to processor 406. Such command selections can be implemented via voice recognition hardware and/or software functioning as the input devices 416. The cursor control 418, for example, is a mouse, a trackball, cursor direction keys, touch screen display, optical character recognition hardware and/or software, etc., for communicating direction information and command selections to processor 406 and for controlling cursor movement on the display 414. In addition, a printer (not shown) may provide printed listings of the data structures, information, etc., or any other data stored and/or generated by the computer system 402.

The computer system 402 performs a portion or all of the processing steps of the invention in response to processor 406 executing one or more sequences of one or more instructions contained in a memory, such as the main memory 408. Such instructions may be read into the main memory 408 from another computer readable medium, such as storage device 412. One or more processors in a multi-processing arrangement may also be employed to execute the sequences of instructions contained in main memory 408. In alternative embodiments, hard-wired circuitry may be used in place of or in combination with software instructions. Thus, embodiments are not limited to any specific combination of hardware circuitry and software.

As stated above, the system 402 includes at least one computer readable medium or memory programmed according to the teachings of the invention and for containing data structures, tables, records, or other data described herein. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling the computer system 402, for driving a device or devices for implementing the invention, and for enabling the computer system 402 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to processor 406 for execution. A computer readable medium may take many forms, including but not limited to, non-volatile media, volatile media, and transmission media. Non-volatile media includes, for example, optical, magnetic disks, and magneto-optical disks, such as storage device 412. Volatile media includes dynamic memory, such as main memory 408. Transmission media includes coaxial cables, copper wire and fiber optics, including the wires that comprise bus 404. Transmission media also may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to processor 406 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to computer system 402 may receive the data on the telephone line and use an infrared transmitter to convert the data to an infrared signal. An infrared detector coupled to bus 404 can receive the data carried in the infrared signal and place the data on bus 404. The bus 404 carries the data to main memory 408, from which processor 406 retrieves and executes the instructions. The instructions received by main memory 408 may optionally be stored on storage device 412 either before or after execution by processor 406.

The computer system 402 also includes a communication interface 420 coupled to bus 404. The communication interface 420 provides a two-way data communication coupling to a network link 422 that may be connected to, for example, a local network 424. For example, the communication interface 420 may be a network interface card to attach to any packet switched local area network (LAN). As another example, the communication interface 420 may be an asymmetrical digital subscriber line (ADSL) card, an integrated services digital network (ISDN) card or a modem to provide a data communication connection to a corresponding type of telephone line. Wireless links may also be implemented via the communication interface 420. In any such implementation, the communication interface 420 sends and receives electrical, electromagnetic or optical signals that carry digital data streams representing various types of information.

Network link 422 typically provides data communication through one or more networks to other data devices. For example, the network link 422 may provide a connection to a computer 426 through local network 424 (e.g., a LAN) or through equipment operated by a service provider, which provides communication services through a communications network 428. In preferred embodiments, the local network 424 and the communications network 428 preferably use electrical, electromagnetic, or optical signals that carry digital data streams. The signals through the various networks and the signals on the network link 422 and through the communication interface 420, which carry the digital data to and from the computer system 402, are exemplary forms of carrier waves transporting the information. The computer system 402 can transmit notifications and receive data, including program code, through the network(s), the network link 422 and the communication interface 420.

Although the present invention is described in terms of a power supply for an electron tube, the present invention is applicable to power supplies for other types of devices, as will be appreciated by those of ordinary skill in the relevant art(s). The apparatus, methods and computer program products as described can also be used to monitor current feeding motors and other electrical equipment where it is desirable to monitor starting and fault currents.

Numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for determining a minimum cooling down time for current limiting devices in a step start process, comprising:

measuring a rate of cooling of said current limiting devices;

connecting power to a load through said current limiting devices for a step start interval of time;

measuring current signals representing current flowing through said current limiting devices;

sampling said current signals during sampling time intervals to obtain step start current sample values;

squaring said step start current sample values to give heat values related to heat dissipated during each said sampling time interval;

summing said heat values for all said sampling time intervals during said step start interval to give a total heat value related to total heat energy dissipated by said current limiting devices during said step start interval; and determining said minimum cooling down time for said current limiting devices, dependent upon said total heat value and said rate of cooling.

2. The method of claim 1, further comprising:

disabling reconnection of said power to said load after disconnection;

waiting for said minimum cooling down time; and enabling said reconnection of said power to said load.

3. The method of claim 2, further comprising:

obtaining voltage signals representing voltage applied to said current limiting devices; generating timing signals from said voltage signals; and, performing said sampling of said current signals during said sampling time intervals determined by said timing signals to obtain said step start current sample values.

4. The method of claim 3, further comprising:
performing the step of generating said timing signals from said voltage signals by detecting zero voltage crossing.

5. The method of claim 3, wherein the step of sampling said current signals to obtain said step start current sample values further comprises:
detecting peak levels of said current signals;
generating analog current sample values representing said peak levels of said current signals;
storing said analog current sample values;
converting said analog current sample values to digital current sample values; and
employing said digital current sample values as said step start current sample values.

6. The method of claim 5, wherein said current limiting devices are resistors.

7. The method of claim 5, wherein said load comprises an electron tube.

8. The method of claim 5, wherein said load comprises a dynamoelectric motor.

9. An apparatus for determining a minimum cooling down time for current limiting devices in a step start process, comprising:
means for measuring a rate of cooling of said current limiting devices;
means for connecting power to a load through said current limiting devices for a step start interval of time;
means for measuring current signals representing current flowing through said current limiting devices;
means for sampling said current signals during sampling time intervals to obtain step start current sample values;
means for squaring said step start current sample values to give heat values related to heat dissipated during each said sampling time interval;
means for summing said heat values for all said sampling time intervals during said step start interval to give a total heat value related to total heat energy dissipated by said current limiting devices during said step start interval; and
means for determining said minimum cooling down time for said current limiting devices, dependent upon said total heat value and said rate of cooling.

10. The apparatus of claim 9, further comprising:
means for disabling reconnection of said power to said load after disconnection;
means for delaying said reconnection for said minimum cooling down time; and
means for enabling said reconnection of said power to said load.

11. The apparatus of claim 10, further comprising:
means for obtaining voltage signals representing voltage applied to said current limiting devices;
means for generating timing signals from said voltage signals; and,
means for performing said sampling of said current signals during said sampling time intervals determined by said timing signals to obtain said step start current sample values.

12. The apparatus of claim 11, wherein said means for generating said timing signals from said voltage signals comprises:
means for detecting zero voltage crossing.

13. The apparatus of claim 11, wherein said means for sampling said current signals to obtain said step start current sample values further comprises:
means for detecting peak levels of said current signals;
means for generating analog current sample values representing said peak levels of said current signals;
means for storing said analog current sample values;
means for converting said analog current sample values to digital current sample values; and
means for employing said digital current sample values as said step start current sample values.

14. The apparatus of claim 13, wherein said current limiting devices are resistors.

15. The apparatus of claim 13, wherein said load comprises an electron tube.

16. The apparatus of claim 13, wherein said load comprises a dynamoelectric motor.

17. A computer program product comprising a computer storage medium having a computer program code mechanism embedded in the computer storage medium for determining a minimum cooling down time for current limiting devices in a step start process, the computer program code mechanism performing the steps of:
measuring a rate of cooling of said current limiting devices;
connecting power to a load through said current limiting devices for a step start interval of time;
measuring current signals representing current flowing through said current limiting devices;
sampling said current signals during sampling time intervals to obtain step start current sample values;
squaring said step start current sample values to give heat values related to heat dissipated during each said sampling time interval;
summing said heat values for all said sampling time intervals during said step start interval to give a total heat value related to total heat energy dissipated by said current limiting devices during said step start interval; and
determining said minimum cooling down time for said current limiting devices, dependent upon said total heat value and said rate of cooling.

18. The computer program product of claim 17, wherein the computer program code mechanism further performs the steps of:
disabling reconnection of said power to said load after disconnection;
waiting for said minimum cooling down time; and
enabling said reconnection of said power to said load.

19. The computer program product of claim 18, wherein the computer program code mechanism further performs the steps of:
obtaining voltage signals representing voltage applied to said current limiting devices; generating timing signals from said voltage signals; and,
performing said sampling of said current signals during said sampling time intervals determined by said timing signals to obtain said step start current sample values.

20. The computer program product of claim 19, wherein the step of generating said timing signals from said voltage signals further comprises:
detecting zero voltage crossing.

21. The computer program product of claim 19, wherein the step of sampling said current signals to obtain said step start current sample values further comprises:
detecting peak levels of said current signals;
generating analog current sample values representing said peak levels of said current signals;
storing said analog current sample values;

converting said analog current sample values to digital current sample values; and employing said digital current sample values as said step start current sample values.

22. The computer program product of claim 21, wherein said current limiting devices are resistors.

23. The computer program product of claim 21, wherein said load comprises an electron tube.

24. The computer program product of claim 21, wherein said load comprises a dynamoelectric motor.

25. An apparatus for determining a minimum cooling down time for a current limiting device in a step start process, comprising:

a source of electrical power;

an electrical load;

a step start contactor selectively connecting said source of electrical power to said load through said current limiting device for a step start interval of time;

a current sensor measuring current flowing through said current limiting device;

means for measuring a rate of cooling of said current limiting device;

a minimum cooling down time circuit, squaring and summing said step start current sample values to give a total heat value related to total heat energy dissipated by said current limiting device during said step start interval, and determining said minimum cooling down time for said current limiting device, dependent upon said total heat value and said rate of cooling.

26. The apparatus of claim 25, wherein said minimum cooling down time circuit acts upon said switching device to prevent reconnection of said source of electrical power to said load for said minimum cooling down time after said load has been disconnected from said source of electrical power.

27. The apparatus of claim 26, wherein said minimum cooling down time circuit further comprises:

a current sampling circuit sampling said current during sampling time intervals to obtain step start current sample values;

a memory storing a program;

a microprocessor employing said stored program.

28. The apparatus of claim 27, further comprising:

a timing circuit generating timing signals from voltage supplied by said source of electrical power;

said current sampling circuit sampling said current during sampling time intervals determined by said timing signals to obtain current sample values.

29. The apparatus of claim 28, wherein said timing circuit comprises:

a zero voltage crossing detector.

30. The apparatus of claim 28, wherein said current sampling circuit further comprises:

a peak detector detecting peak levels of said current;

a sample and hold circuit generating and storing analog current sample values representing said peak levels of said current;

an analog to digital convertor converting said analog current sample values to digital current sample values.

31. The apparatus of claim 30, wherein said current limiting device is a resistor.

32. The apparatus of claim 30, wherein said load comprises an electron tube.

33. The apparatus of claim 30, wherein said load comprises a dynamoelectric motor.

34. The apparatus of claim 25, wherein said minimum cooling down time circuit comprises: a digital signal processor.

35. The apparatus of claim 34, wherein said current limiting device is a resistor.

36. The apparatus of claim 34, wherein said load comprises an electron tube.

37. The apparatus of claim 34, wherein said load comprises a dynamoelectric motor.

* * * * *